United States Patent [19]

Tsuboi et al.

[11] 4,164,809

[45] Aug. 21, 1979

[54] MACHINE TOOL WITH AUTOMATIC TOOL CHANGE APPARATUS

[75] Inventors: Akira Tsuboi; Tetsuro Yamakage, both of Kariya, Japan

[73] Assignee: Toyoda-Koki Kabushiki-Kaisha, Aichi, Japan

[21] Appl. No.: 858,016

[22] Filed: Dec. 6, 1977

[30] Foreign Application Priority Data

Dec. 6, 1976 [JP] Japan ............................... 51-146257
Feb. 16, 1977 [JP] Japan ............................... 52-16484

[51] Int. Cl.² ........................................... B23Q 3/157
[52] U.S. Cl. ..................................... 29/568; 211/1.5
[58] Field of Search ........................... 29/568; 211/1.5

[56] References Cited

U.S. PATENT DOCUMENTS

| Re. 25,737 | 3/1965 | Brainard et al. | 29/568 |
| 3,217,406 | 11/1965 | Dever | 29/568 |
| 3,218,706 | 11/1965 | Zankl et al. | 29/568 |
| 3,727,301 | 4/1973 | Tsuzuki et al. | 29/568 |
| 3,807,011 | 4/1974 | Harman et al. | 29/568 |

*Primary Examiner*—Othell M. Simpson
*Assistant Examiner*—Z. R. Bilinsky
*Attorney, Agent, or Firm*—Oblon, Fisher, Spivak, McClelland & Maier

[57] ABSTRACT

In a machine tool with an automatic tool change apparatus, a tool storage magazine for removably storing a plurality of tools is installed, extending within a column which slidably supports a spindle head. The column is formed with an opening. Means are provided for moving a tool from the magazine outside the column, through the opening therein, for effecting a tool change operation.

5 Claims, 7 Drawing Figures

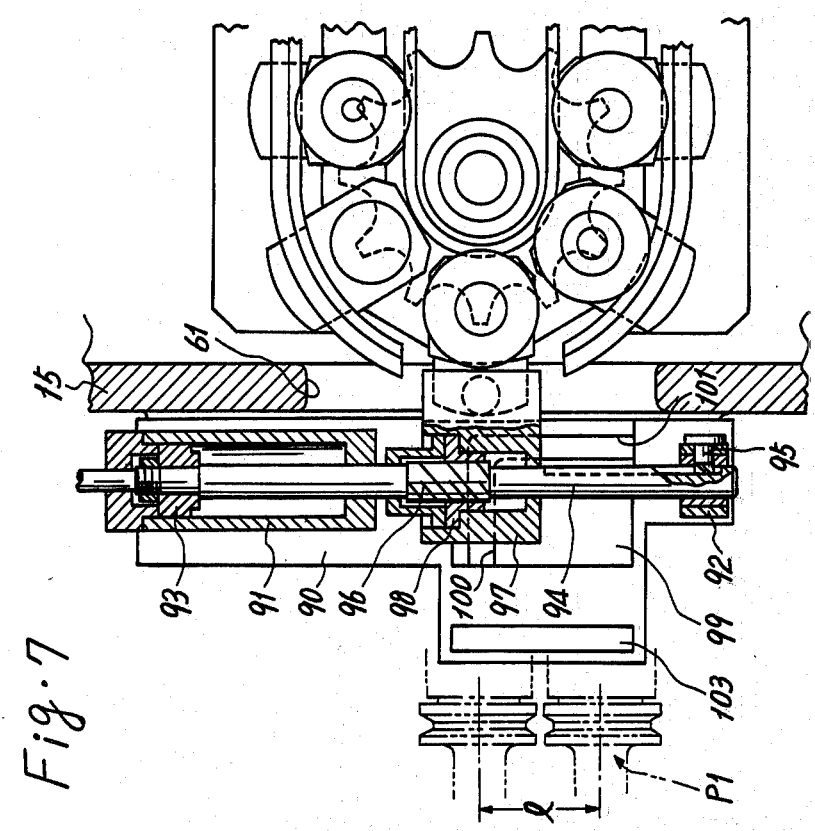

MACHINE TOOL WITH AUTOMATIC TOOL CHANGE APPARATUS

BACKGROUND OF THE INVENTION

1. Field of the Invention

The present invention relates generally to a machine tool with an automatic tool change apparatus, and more particularly to a machine tool installing a tool storage magazine, extending within a column which slidably supports a spindle head.

2. Description of the Prior Art

In general, in a machine tool with an automatic tool change apparatus wherein a spindle head is mounted on a side surface of a column for a vertical sliding movement, a tool storage magazine is provided on the spindle head or on the top or the side of the column.

In a machine tool providing a tool storage magazine on a spindle head, a tool change operation can be performed at any position of the spindle head. However, the number of tools to be stored is considerably limited and the weight of the spindle head becomes large because of the tool storage magazine.

In a machine tool providing a tool storage magazine on the top or the side of a column, the tool storage magazine is installed remote from the spindle head. For this reason, where the tool storage magazine is provided on the top of the column, the spindle head has to be moved to an upper position at every tool change operation, which results in a longer time loss and a poor manipulation of the tool storage magazine. Where the tool storage magazine is provided on the side of the column, the distance between the tool storage magazine and the spindle head becomes large and therefore an additional tool transfer device has to be provided to transfer a tool from the tool storage magazine to a tool change position where a tool change arm performs a tool change operation, which results in complicated construction and a longer tool change operation.

SUMMARY OF THE INVENTION

It is, therefore, an object of the present invention to provide a new and improved machine tool capable of performing a tool change operation within a short time.

Another object of the present invention is to provide a new and improved machine tool installing a tool storage magazine, extending within a column which slidably supports a spindle head.

A further object of the present invention is to provide a new and improved machine tool of the character set forth above wherein the column is formed with an opening through which a tool is removed from the tool storage magazine outside the column.

Briefly, according to the present invention, these and other objects are achieved by providing a machine tool for machining a workpiece, as mentioned below. An upstanding column is formed with an opening. A spindle head is slidably mounted upon the column and adapted to be positioned to a first predetermined position. A spindle is rotatably supported by the spindle head. A tool storage magazine extends within the column for removably storing a plurality of tools and for selectively indexing the tools to a second predetermined position aligned with the opening inside the column. Means are provided for moving a tool between the second predetermined position and a third predetermined position outside the column through the opening. Means also are provided for exchanging a tool at the third predetermined position for a tool held by the spindle supported by the spindle head at the first predetermined position.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which:

FIG. 7 is a sectional view taken along the line VII—VII in FIG. 6.

DETAILED DESCRIPTION OF THE PREFERRED EMBODIMENT

Figure 1:
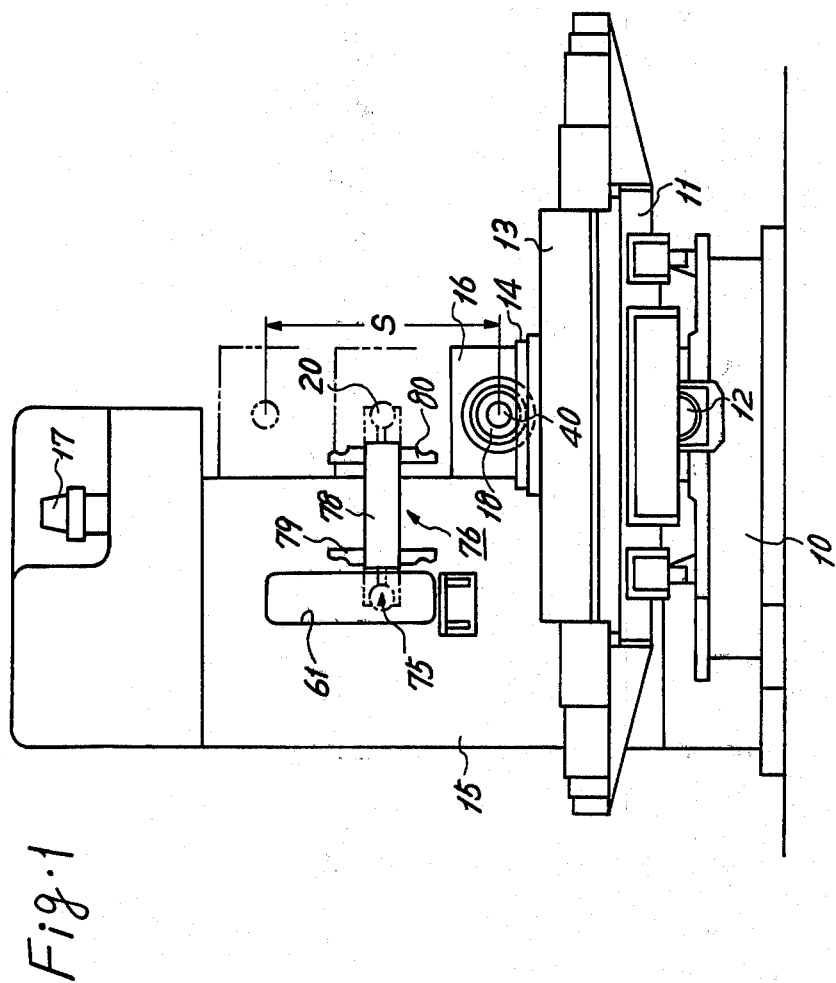
FIG. 1 is a front elevational view of a machine tool provided with an automatic tool change apparatus according to the present invention.
Figure 2:
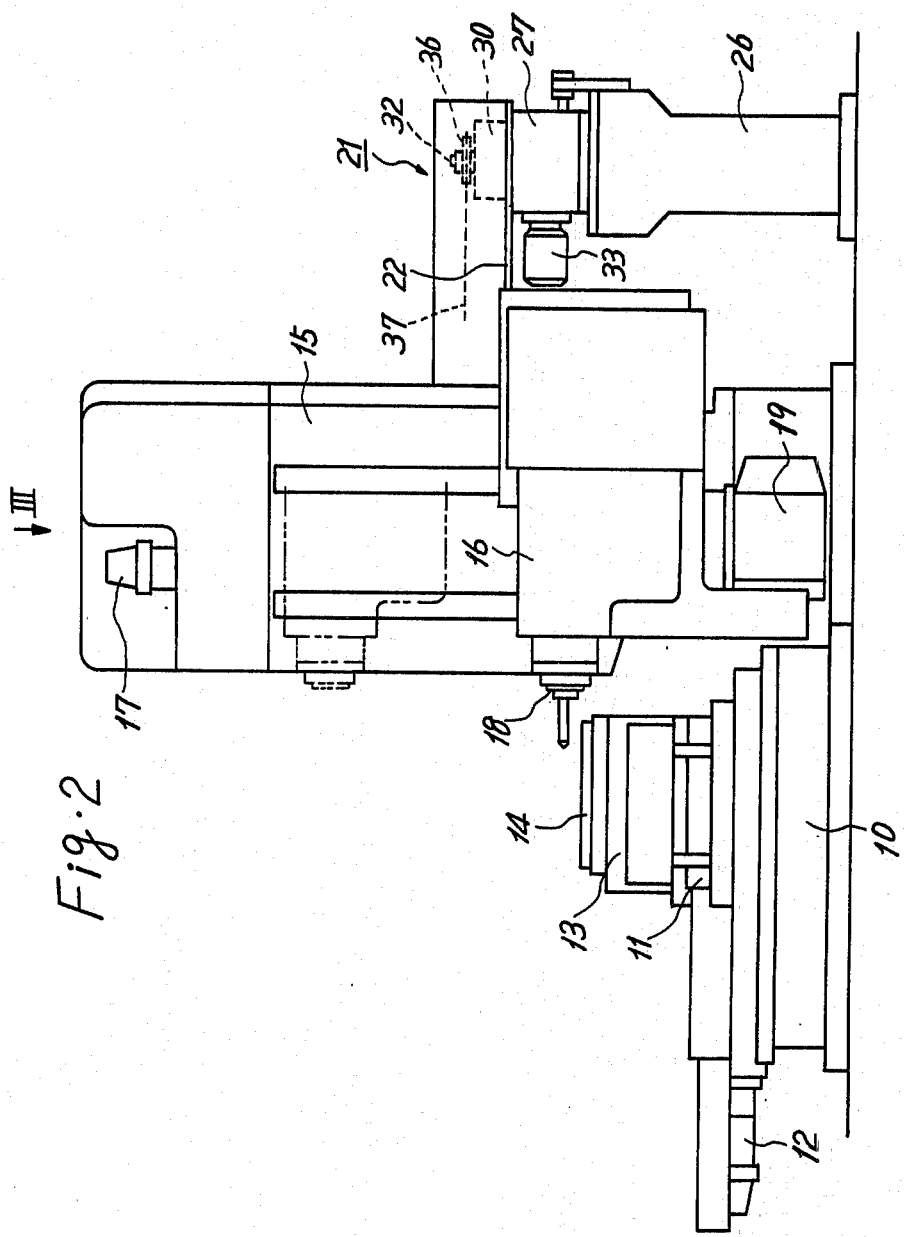
FIG. 2 is a side view of the machine tool.

Referring now to the drawings, wherein like reference numerals or characters refer to identical or corresponding parts throughout the several views, and more particularly to FIGS. 1 and 2, there is shown a bed 10 on which a slide table 11 is mounted to be slidable in a transverse direction. A feed movement of the slide table 11 is controlled by a motor 12. A saddle 13 is mounted on the slide table 11 to be slidable in a longitudinal direction, and is moved by a motor, not shown. An index table 14 is rotatably mounted on the saddle 13 to support a workpiece thereon. An upstanding column 15 is installed at the rear of the bed 10. A spindle head 16 is supported on the side surface of the column 15 to be slidable in a vertical direction, and is moved by a motor 17. A spindle 18 for removably holding a tool is supported in the spindle head 16 to be rotatable about a horizontal axis in the transverse direction and is driven by a motor 19.

The spindle head 16 is adapted to be positioned at a predetermined position 20 for a tool change operation by means of a tool change apparatus, which will be described later. The predetermined position 20 is determined substantially at the middle of the stroke S of the spindle head 16 in the vertical direction. The spindle head 16 can therefore reach the predetermined position 20 from a machining operation finishing position by an up or down movement at most the middle of the stroke S.

Figure 3:
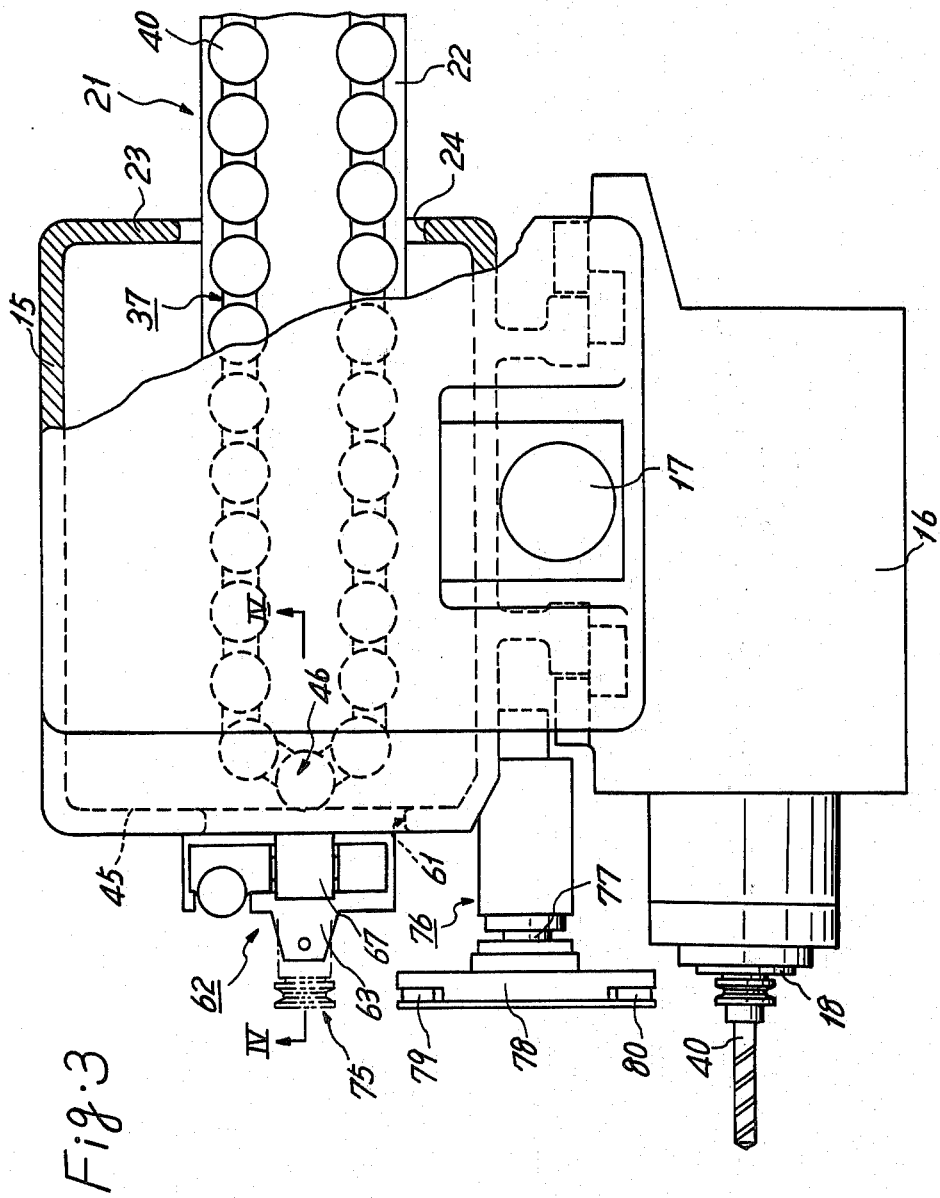
FIG. 3 is an enlarged view as viewed in the direction of the arrow III in FIG. 2.
Figure 4:
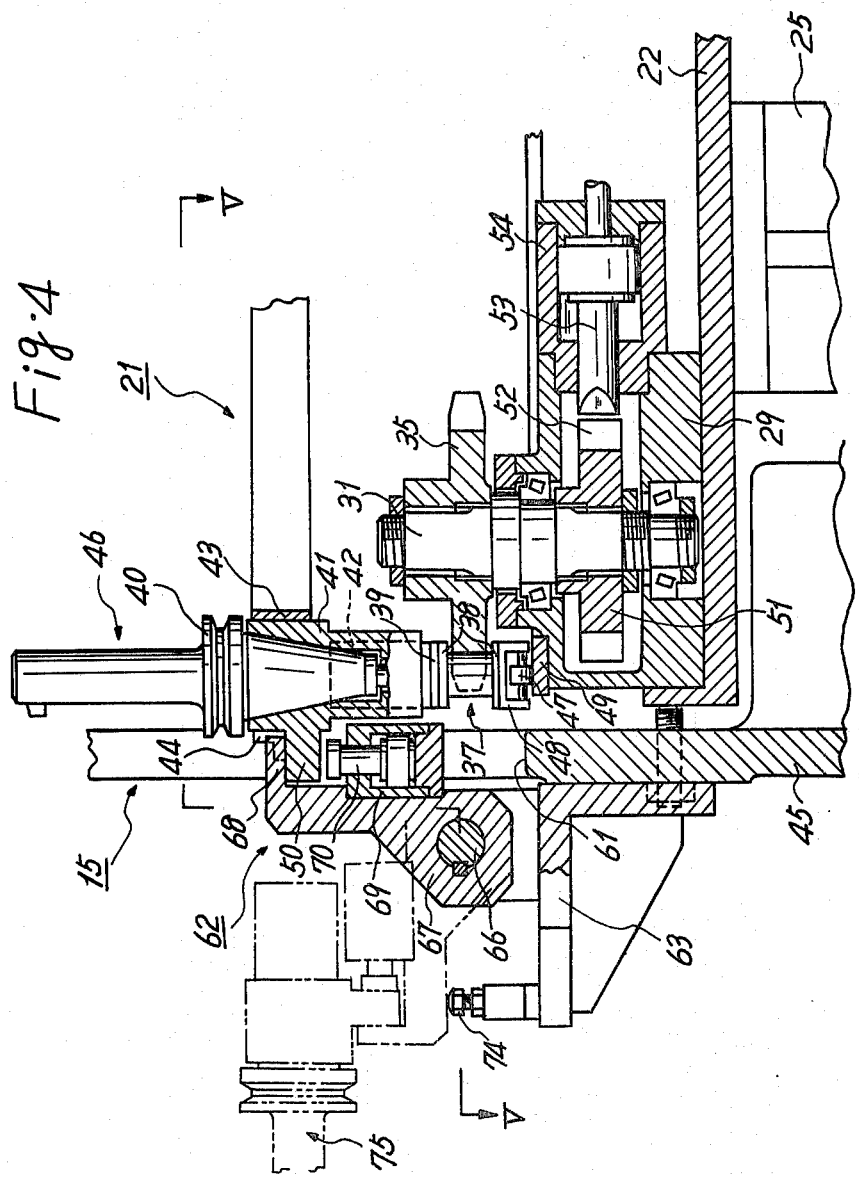
FIG. 4 is an enlarged sectional view taken along the line IV—IV in FIG. 3.
Figure 5:
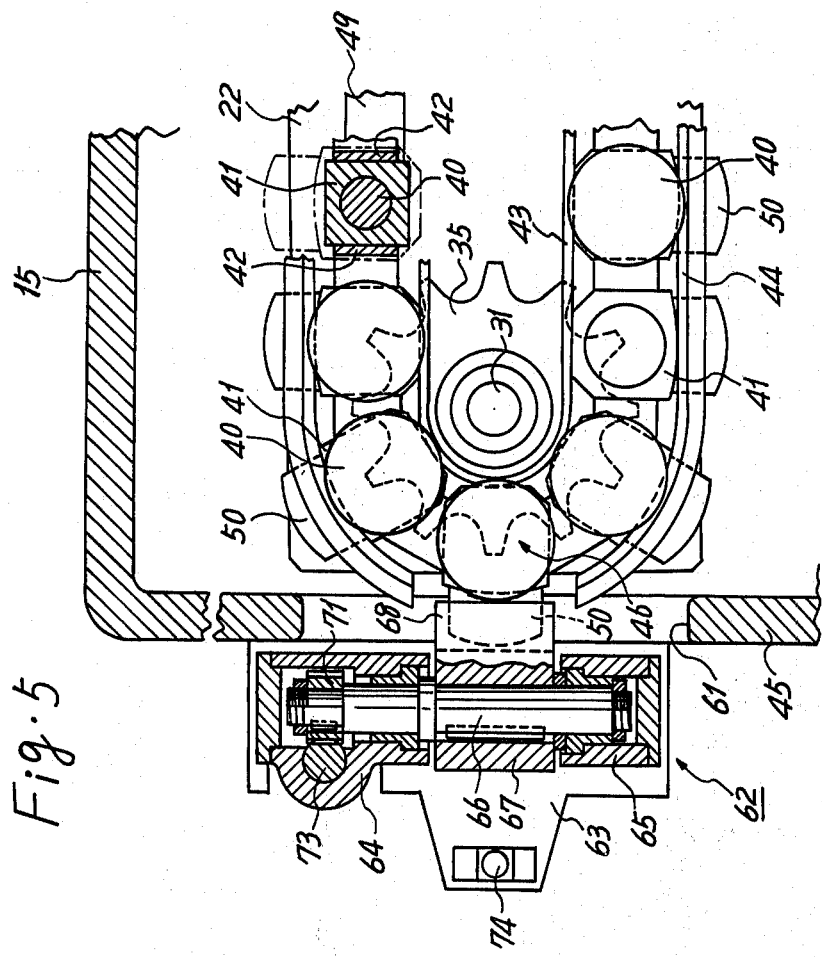
FIG. 5 is a sectional view taken along the line V—V in FIG. 4.

Referring to FIGS. 3, 4 and 5, a tool storage magazine is generally indicated at 21. A horizontal magazine base 22, forming a base of the tool storage magazine 21, extends at its one end into the column 15 through an opening 24 formed on the rear wall of the column 15 and is fixed on a bracket 25 installed within the column 15. The other end of the magazine base 22 extends outside the column 15 and is fixed on a gear box 27 mounted on a support frame 26 installed on the floor, as shown in FIG. 2. On the opposite ends of the magazine base 22 are mounted support blocks 29 and 30 which rotatably support vertical driven and drive shafts 31 and 32, respectively. The drive shaft 32 is driven through a gearing, not shown, by a drive motor 33 secured to the gear box 27. The driven and drive shafts 31 and 32 have keyed thereto sprocket wheels 35 and 36, respectively, around which a flexible endless chain 37 is engaged and extended. The chain 37 comprises a plurality of chain links 38 connected with each other. A socket support member 39 is secured on the alternate chain link 38 and removably supports a tool socket 41 which also removably holds a tool or tool holder 40. More specifically, as shown in FIG. 5, the socket support member 39 is formed with a pair of vertical plates 42 and 42 which are spaced apart a predetermined distance in the direction of movement of the chain 37. The lower portion of the tool socket 41 is received between the plates 42 and 42 to hold the tool 40 upwardly. The tool socket 41 supported on the socket support member 39 is moved with the movement of the chain 37 along inner and outer guide plates 43 and 44 mounted on the magazine base 22 to a predetermined index position 46 facing a front wall 45 of the column 15. The outer guide plate 44 is cut out at the index position 46 to allow the tool socket 41 to be drawn out therefrom. The chain link 38, having the socket support member 39 secured thereto, is provided at the underside thereof with a roller support 48 which rotatably supports a roller 47. The roller 47 is moved on a support rail 49 provided between the support blocks 29 and 30 along the chain 37. The tool socket 41 is provided with an engaging member 50 projecting outwardly which is to be engaged with a tool drawing out device 62, as will be described later.

An index plate 51 is secured to the driven shaft 31 and is provided at its periphery with a plurality of equi-spaced recesses 52. A positioning cylinder 54 is mounted on the support block 29 and slidably receives a piston rod 53 which is engageable with one of the recesses 52. With engagement of the piston rod 53 is one of the recesses 52 by the operation of the positioning cylinder 54, the tool socket 41 holding the required tool 40 can be accurately positioned at the index position 46.

The front wall 45 of the column 15 is formed with an opening 61, through which the required tool 40 is drawn out from the index position 46 within the column 15. The tool drawing out device 62 will now be described with reference to FIGS. 4 and 5.

A support frame 63 is secured on the front side of the column 15 below the opening 61. A pair of support blocks 64 and 65 are mounted on the support frame 63 with a predetermined distance therebetween to hold a support shaft 66, which is rotatable about a horizontal axis perpendicular to the spindle axis. The support shaft 66 has keyed thereto a drawing out arm 67 which is formed at its one end with an engaging member 68 engageable with the upper surface of the engaging member 50 of the tool socket 41 indexed at the index position 46. A clamp cylinder 69 is secured to the drawing out arm 67 in opposite relation with the engaging member 68 and slidably supports a piston rod 70 engageable with the underside of the engaging member 50. The support shaft 66 is provided at its one end with a pinion 71 which is engaged with a rack 73 actuated by a drawing out cylinder, not shown, mounted on the support block 64.

With this arrangement, the tool socket 41 can pass through between the engaging member 68 of the drawing out arm 67 and the piston rod 70 in a normal situation. When the tool socket 41 holding the required tool 40 is indexed at the index position 46, the engaging member 50 is sandwiched between the piston rod 70 and the engaging member 68 by the actuation of the clamp cylinder 69. Thereafter, the drawing out arm 67 is rotated 90 degrees with the support shaft 66 through the rack 73 and the pinion 71 by the actuation of the drawing out cylinder, whereby the tool socket 41 is removed from the socket support member 39 of the chain 37 and drawn out through the opening 61 of the column 15 to a tool change position 75 outside the column 15. With this tool drawing out operation, the axis of the tool 40 of the tool socket 41 is aligned in parallel relation with the spindle axis. A stop bolt 74 is mounted on the support frame 63 to restrict the angular extent of the drawing out arm 67.

A tool transfer device 76 is secured on the column 15 to exchange the tools 40 between the tool socket 41 drawn out from the tool storage magazine 21 and the spindle 18. The tool transfer device 76 supports a shaft 77 which is rotatable and slidable in a direction parallel with the spindle axis. A tool change arm 78 is secured at its center to the front end of the shaft 77 and provided at its opposite ends with pivotable tool grips 79 and 80, to be opened and closed.

The operation of the machine tool according to the present invention will now be described.

When a predetermined machining operation is completed by the tool 40 held in the spindle 18, the slide table 11 is moved away from the tool 40 and the spindle head 16 is moved upward or downward toward the predetermined position 20. The tool socket 41 holding the tool 40 to be next used is indexed in advance at the index position 46 of the tool storage magazine 21 and the engaging member 50 thereof is being sandwiched by the engaging member 68 of the drawing out arm 67 and the piston 70.

At the same time the spindle head 16 is moved toward the predetermined position 20, the drawing out arm 67 is rotated with the support shaft 66 by the drawing out cylinder, not shown, counterclockwise, as viewed in FIG. 4, whereby the tool socket 41 is removed away from the pair of the plates 42 and 42 of the socket support member 39 and drawn out outside the column 15 through the opening 61 of the front wall 45. When the drawing out arm 67 is rotated into abutting engagement with the stop bolt 74, the tool socket 41 held thereby is positioned at the tool change position 75 where the same is aligned in parallel relation with the spindle 18 of the spindle head 16 positioned at the predetermined position 20. With the tool socket 41 being rotated into the tool change position 75 and the spindle head 16 being positioned at the predetermined position 20, the tool grips 79 and 80 of the tool change arm 78 are closed to grip the tools 40 and 40 held by the spindle 18 and the tool socket 41. Subsequently, the tool change arm 78 is advanced and rotated 180 degrees. The tool change arm 78 is then retracted to insert the used tool 40 into the tool socket 41 and the new tool 40 into the spindle 18. Thereafter, the tool grips 79 and 80 are opened, and the spindle head 16 is moved upward or downward for a machining operation by the new tool 40.

The used tool 40 held by the tool socket 41 is returned to the tool storage magazine 21 within the column 15 by the swinging movement of the drawing out arm 67 in the reverse direction.

Figure 6:
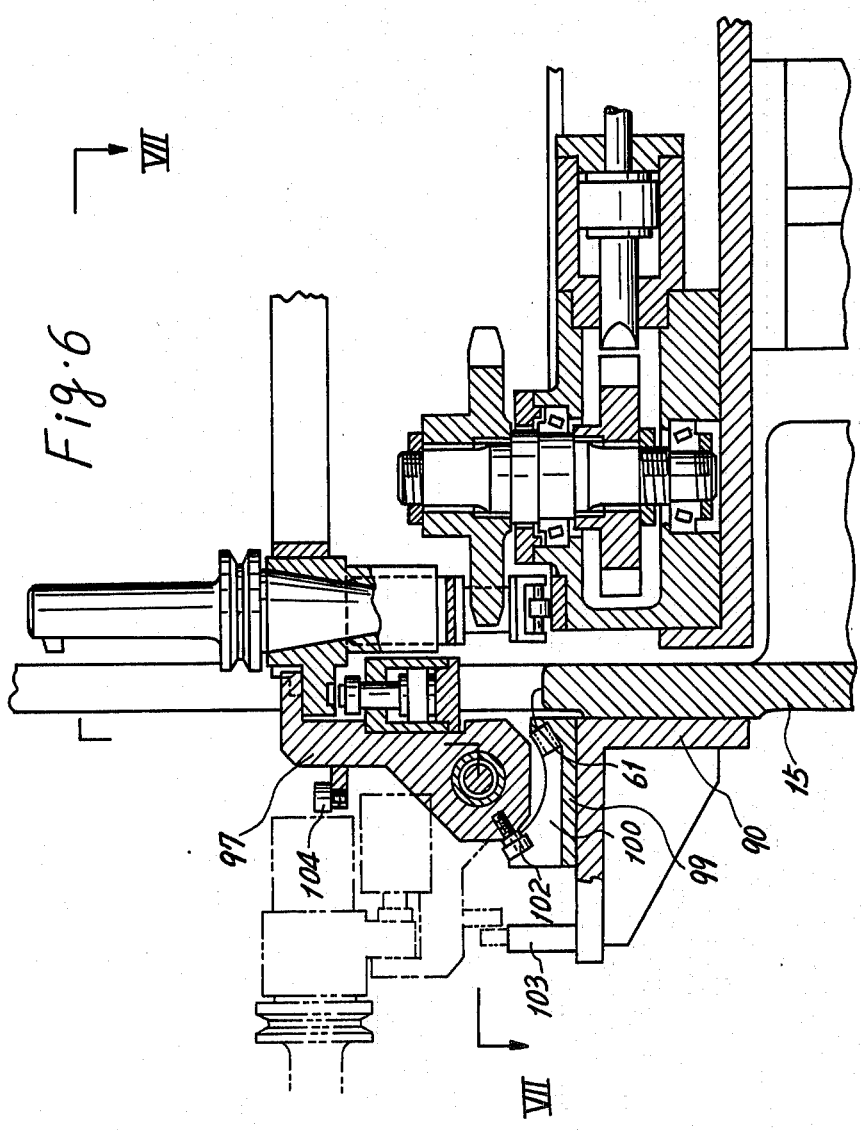
FIG. 6 shows a modification of the apparatus shown in FIG. 4.

A modification of the tool drawing out device 62 will now be described, with references to FIGS. 6 and 7, which allows the tool storage magazine 21 to be installed a little remote from the spindle head 16.

A support bracket 90 is secured on the front side of the column 15 below the opening 61. A drive cylinder 91 and a bearing block 92 are mounted on the support bracket 90 with a predetermined distance therebetween. The drive cylinder 91 slidably receives a piston 93 which is connected to one end of a support shaft 94. The other end of the support shaft 94 is keyed by a key member 95 in the bearing block 92 to be slidable in the axial direction, but is restrained from rotation relative thereto. The support shaft 94 is provided at its middle with a threaded portion 96 with a large lead angle. A tool socket taking out arm 97 is slidably and rotatably mounted on the support shaft 94 and has secured thereto a nut member 98 being threadedly engaged with the threaded portion 96. A cam plate 99 is secured on the support bracket 90 below the taking out arm 97. On the upper surface of the cam plate 99 are continuously formed a circumferential cam groove 100 along the circumference of the support shaft 94 and an axial cam groove 101 along the axis of the support shaft 94. An engaging roller 102 journalled by the taking out arm 97 is engageable with the cam grooves 100 and 101.

A guide rail 103 is mounted on the support bracket 90. A support roller 104 is journalled by the taking out arm 97 and is supported by and moved along the guide rail 103 under the condition of the tool socket 41 being pivoted.

When the spindle head 16 is moved toward the predetermined position 20 after a predetermined machining operation is completed by the tool 40 held in the spindle 18, pressurized fluid is admitted into the drive cylinder 91 to move the support shaft 94, together with the piston 93, in the downward direction, as viewed in FIG. 7. At this time, the engaging roller 102 of the taking out arm 97 is engaged with the circumferential cam groove 100 of the cam plate 99 to restrain the taking out arm 97 from being moved axially. Accordingly, the taking out arm 97 is rotated through the connection between the threaded portion 96 and the nut member 98 by the axial thrust force acting on the support shaft 94 to thereby remove the tool socket 41 sandwiched thereby away from the socket support member 39. In this manner, the taking out arm 97 is rotated 90 degrees about the support shaft 94 to pivot the tool 40 into a horizontal position parallel to the spindle axis, where the support roller 104 journalled by the taking out arm 97 is engaged on the guide rail 103 and the engaging roller 102 is engaged with the end edge of the circumferential cam groove 100 to be aligned with the axial cam groove 101. The taking out arm 97 is therefore restrained from rotation, but allowed to be moved axially, whereby the taking out arm 97 is moved together with the support shaft 94 by the axial thrust force acting on the support shaft 94 through the threaded portion 96 and the nut member 98. Therefore, the tool socket 41 being pivoted is moved radially of the tool 40 a predetermined distance into a position P1 where the tool change arm 78 can perform a tool change operation.

Obviously, numerous modification and variations of the present invention are possible in light of the above teachings. It is to be understood, therefore, that within the scope of the appended claims, the invention may be practiced otherwise than as specifically described herein.

What is claimed as new and desired to be secured by letters patent of the United States is:

1. A machine tool for machining a workpiece comprising:
   an upstanding column having a front wall and a side surface, said column being formed with an opening at its front wall;
   a spindle head slidably mounted upon the side surface of said column and adapted to be positioned to a first predetermined position;
   a spindle rotatably supported by said spindle head;
   a magazine base extending within said column;
   a plurality of sprocket wheels rotatably supported on said magazine base;
   a flexible endless chain engaged by said sprocket wheels;
   a plurality of socket support members, each secured on said endless chain and formed with a pair of vertical plates, spaced apart a predetermined distance in the direction of movement of said endless chain;
   a plurality of tool sockets, each removably received between said pair of vertical plates for removably and vertically supporting a tool;
   drive means operatively connected to one of said sprocket wheels for driving said endless chain;
   means for selectively indexing said tool socket to a second predetermined position adjacent said opening inside said column;
   means for moving said tool socket, removably holding said tool, between said second predetermined position and a third predetermined position outside said column through said opening; and
   means for exchanging said tool held in said tool socket at a third predetermined position for said tool held by said spindle supported by said spindle head at said first predetermined position.

2. A machine tool as claimed in claim 1, further comprising outer and inner guide plates mounted upon said magazine base for guiding said tool socket therebetween, said outer guide plate being cut out at said predetermined position to allow said tool socket at said second predetermined position to be moved by said moving means into said third predetermined position.

3. A machine tool as claimed in claim 1, wherein each of said tool sockets is provided with a first engaging member, and wherein said moving means comprises a swing arm having a second engaging member engageable with said first engaging member of said tool socket at said second predetermined position, means secured to said swing arm for clamping said first engaging member of said tool socket at said second predetermined position in cooperation with said second engaging member, and means for swinging said swing arm to bring said tool socket at said second predetermined position into said third predetermined position where said tool socket holds said tool in a horizontal direction.

4. A machine tool as claimed in claim 1, wherein each of said tool sockets is provided with a first engaging member, and wherein said moving means comprises an arm having a second engaging member engageable with said first engaging member of said tool socket at said second predetermined position, means secured to said arm for clamping said first engaging member of said tool socket at said second predetermined position in cooperation with said second engaging member, and means for swinging said arm to bring said tool socket at said second predetermined position into an intermediate position where said tool socket holds said tool in a horizontal direction and for shifting said arm to bring said tool socket from said intermediate predetermined position into said third predetermined position in a horizontal direction.

5. A machine tool as claimed in claim 4, wherein said arm is provided with an engaging roller journalled thereby, and wherein said swinging and shifting means comprises:
   a hydraulic actuator;
   a piston slidably received in said actuator;
   a support shaft connected at one end thereof to said piston to be slidable in the axial direction but being restrained from rotation;
   a threaded portion formed on said support shaft;
   a nut member threadedly engaged with said threaded portion and fixedly connected to said arm;
   a cam member formed on its upper surface with a circumferential cam groove along the circumference of said support shaft and an axial cam groove along the axis of said support shaft being continuous to said circumferential cam groove; and
   said engaging roller of said arm being engaged with said circumferential cam groove to swing said arm and being engaged with said axial cam groove to shift said arm.

* * * * *